(12) United States Patent
Burns et al.

(10) Patent No.: US 7,822,610 B2
(45) Date of Patent: Oct. 26, 2010

(54) USE OF MULTIPLE SPEECH RECOGNITION SOFTWARE INSTANCES

(75) Inventors: Stephen S. Burns, Loveland, OH (US); Mickey W. Kowitz, Maineville, OH (US)

(73) Assignee: Mobile Voice Control, LLC, Burlington, MA (US)

( * ) Notice: Subject to any disclaimer, the term of this patent is extended or adjusted under 35 U.S.C. 154(b) by 1038 days.

(21) Appl. No.: 11/501,998

(22) Filed: Aug. 9, 2006

(65) Prior Publication Data

US 2007/0156412 A1 Jul. 5, 2007

Related U.S. Application Data

(60) Provisional application No. 60/706,806, filed on Aug. 9, 2005.

(51) Int. Cl.
*G10L 21/00* (2006.01)
*G10L 15/00* (2006.01)
(52) U.S. Cl. .................... 704/270.1; 704/231; 704/270
(58) Field of Classification Search .................. None
See application file for complete search history.

(56) References Cited

U.S. PATENT DOCUMENTS

| 5,153,905 A | 10/1992 | Bergeron et al. | |
|---|---|---|---|
| 6,122,613 A * | 9/2000 | Baker | 704/235 |

(Continued)

FOREIGN PATENT DOCUMENTS

WO PCT/US2006/031334 8/2006

(Continued)

OTHER PUBLICATIONS

Franz et al., *Searching the Web by Voice*, Proc. 19th Intl. Conference on Computational Linguistics, 2002, pp. 1213-1217.

(Continued)

*Primary Examiner*—Matthew J Sked
(74) *Attorney, Agent, or Firm*—Chapin IP Law, LLC; Barry W. Chapin, Esq.

(57) ABSTRACT

A wireless communication device is disclosed that accepts recorded audio data from an end-user. The audio data can be in the form of a command requesting user action. Likewise, the audio data can be converted into a text file. The audio data is reduced to a digital file in a format that is supported by the device hardware, such as a .wav, .mp3, .vnf file, or the like. The digital file is sent via secured or unsecured wireless communication to one or more server computers for further processing. In accordance with an important aspect of the invention, the system evaluates the confidence level of the of the speech recognition process. If the confidence level is high, the system automatically builds the application command or creates the text file for transmission to the communication device. Alternatively, if the confidence of the speech recognition is lower, the recorded audio data file is routed to a human transcriber employed by the telecommunications service, who manually reviews the digital voice file and builds the application command or text file. Once the application command is created, it is transmitted to the communication device. As a result of the present invention, speech recognition in the context of a communications devices has been shown to be accurate over 90% of the time.

8 Claims, 5 Drawing Sheets

U.S. PATENT DOCUMENTS

Figure 1:
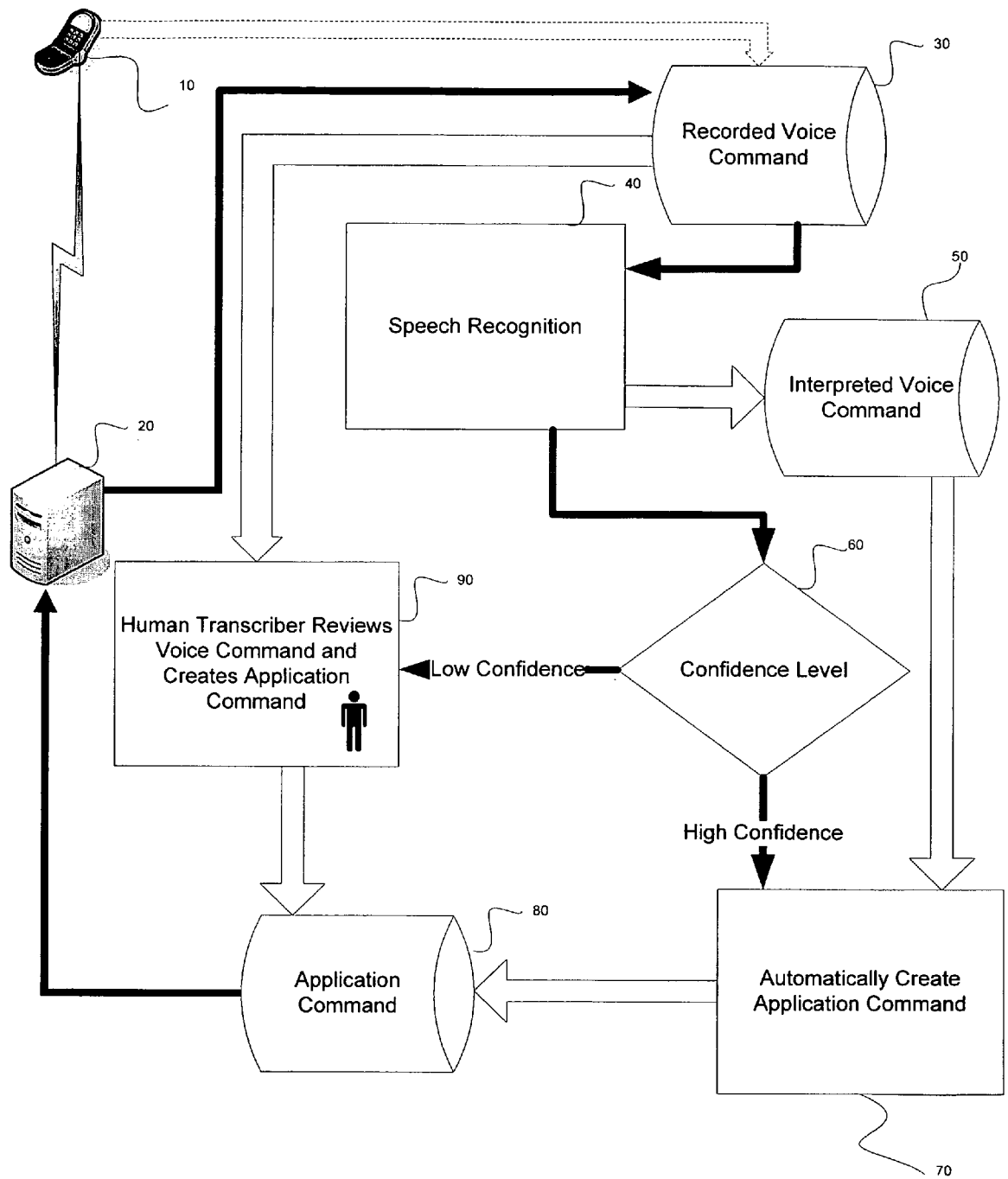

| | | | |
|---|---|---|---|
| 6,173,259 B1 * | 1/2001 | Bijl et al. | 704/235 |
| 6,578,007 B1 | 6/2003 | Howes et al. | |
| 6,621,892 B1 | 9/2003 | Banister et al. | |
| 6,760,705 B2 * | 7/2004 | Dvorak | 704/270.1 |
| 7,003,456 B2 * | 2/2006 | Gillick et al. | 704/235 |
| 7,027,987 B1 | 4/2006 | Franz et al. | |
| 7,146,321 B2 * | 12/2006 | Cyr et al. | 704/270.1 |
| 7,340,395 B2 * | 3/2008 | Gurram et al. | 704/231 |
| 2002/0055845 A1 * | 5/2002 | Ueda et al. | 704/270 |
| 2002/0178003 A1 | 11/2002 | Gehrke et al. | |
| 2003/0012348 A1 | 1/2003 | Skladman et al. | |
| 2003/0065724 A1 | 4/2003 | Clark | |
| 2004/0181467 A1 | 9/2004 | Raiyani et al. | |
| 2004/0204941 A1 | 10/2004 | Israch et al. | |
| 2005/0171775 A1 | 8/2005 | Doyle | |
| 2006/0009980 A1 * | 1/2006 | Burke et al. | 704/270 |
| 2006/0047767 A1 | 3/2006 | Dodrill et al. | |

FOREIGN PATENT DOCUMENTS

WO PCT/US2006/031500 8/2006

OTHER PUBLICATIONS

IRS (PCT/US07/24865).
PCT/US06/31265 (Search Report).

* cited by examiner

USE OF MULTIPLE SPEECH RECOGNITION SOFTWARE INSTANCES

CROSS REFERENCE TO RELATED APPLICATIONS

This application claims priority to and the benefit of U.S. provisional patent application No. 60/706,806, filed on Aug. 9, 2005, hereby incorporated by reference.

1. FIELD OF THE INVENTION

The present invention relates to the use of wireless server-based voice recognition tools to control various wireless communication devices via voice commands.

2. BACKGROUND OF THE INVENTION

Voice controlled systems have been available and in use for many years. These systems, which typically incorporate a combination of computer hardware and software resident on the controlled device, allow an end-user to control a device by recitation of oral commands. The oral commands are then converted into executable commands which can control the electronic device. Today, the voice recognition systems that drive voice controlled devices can be found in various types of technology ranging from computer interfaces, automobiles, cellular telephones and other hand held devices.

Wireless communication devices particularly lend themselves to voice control. These wireless devices typically combine cellular telephones, electronic mail, contact lists, calendaring, Internet web browsing, multimedia players and many other similar electronic applications into a single electronic package that is small enough to fit in a pocket or purse. Interaction with wireless devices is usually via a small keyboard attached to the wireless device. Since the keyboard is considerably smaller than a standard keyboard, mistakes are common and can be disruptive. Moreover, the typical use of these devices, such as while driving, makes it impractical to monitor the device and enter commands manually. Ultimately, these problems discourage the use of the device for its intended purposes. Thus, it is desirable to be able to control a wireless device using voice control rather than a keyboard.

Current wireless communication devices depend upon programming that resides entirely on the device. The capabilities of these systems is greatly restricted by the reduced memory and computing power that is generally available on mobile voice-controlled devices. However, the accuracy of speech recognition is poor in quality mostly because of environmental challenges that face mobile users such as, background noise, user linguistical-accents and cost-effective hardware such as a microphone that provides less than high quality audio.

U.S. Pat. No. 7,027,987 ("the '987 patent) which discloses a method of voice interfacing to a search engine. However, as the inventors of the '987 patent report in their paper, experimentation resulted in correct recognition of spoken words only 60% of the time, see, Alex Franz and Brian Milch. *Searching the Web by Voice*, Proc. 19th International Conference on Computational Linguistics, 1213-1217 (2002).

Accordingly, it is desired to have a voice controlled wireless communications device that can execute various applications while maintaining a very high accuracy of recognition of spoken words.

SUMMARY OF THE INVENTION

A wireless communication device accepts recorded audio data from an end-user. The audio data can be in the form of a command requesting action the that is typically performed manually on the device, such as sending an email, schedule an appointment, initiate a telephone call, search the internet, play a multi-media file, such as an MP3 song, or request news related information, such as sports scores or stock quotes. Likewise, the audio data can be text to be converted into a text file and kept as a note, letter, or other textual data. The audio data is reduced to a digital voice file in a format that is supported by the device hardware, such as a .wav, .mp3, .vnf file, or the like. The digital voice file is sent via secured or unsecured wireless communication to one or more server computers for further processing. The server computer is typically managed by the same telecommunications service that provides telephone and email access for the communication device. Once the audio data is recognized, the server processes the data by building an application command or text file and sends the resultant information to the wireless device for proper execution.

Transporting the audio data to a server for speech recognition allows requests to be processed by more powerful speech engines. However, this does not improve the quality of the data being interpreted. As proven by many studies and failed systems (http://www.cs.berkeley.edu/%7Emilch/papers/gvs.pdf) if the quality of the audio is poor, the best speech recognition won't produce accurate results. This causes users to stop using the system.

Thus the present invention overcomes the problem of word recognition accuracy by not only utilizing the power of the server computer to perform speech recognition, but the invention also evaluates the confidence level of the of the speech recognition process. If the confidence level is high, the system automatically builds the application command or creates the text file for transmission to the communication device. Alternatively, if the confidence of the speech recognition is low, the recorded audio data file is routed to a human transcriber employed by the telecommunications service, who manually reviews the digital voice file and builds the application command or text file. Once the application command is created, it is transmitted to the communication device. As a result of the present invention, speech recognition in the context of a communications devices has been shown to be accurate over 90% of the time.

DETAILED DESCRIPTION

A voice controlled system for wireless communication devices is shown in FIG. 1. The system comprises a handheld communication device 10 communicating wirelessly with one or more server computers 20. At a minimum, the communication device 10 has the ability to run programs, also referred to as applications. The communication device 10 also has an audio recording capability, such as a microphone, which can record audio data in the form of a voice command, from a user and save the commands as recorded voice command files 30.

A user of the communication device 10 accesses the voice-command application which is resident on the device 10, and speaks a command to control the device 10 into the device's microphone. The device 10 records the voice command and creates a recorded voice command file 30. The device 10 can optionally store the recorded voice command file 30 internally for future use. The communication device 10 then wirelessly sends the recorded voice command file 30 to the server computer 20 and awaits the server's response.

Upon receipt of the recorded voice command file 30, the server computer 20 executes a series of programmatic modules to process the recorded voice command file 30. Initially, the server computer 20 performs speech recognition 40 on the recorded voice command file 30, which produces an interpreted voice command 50. In the case where multiple servers are running concurrent speech recognition processes, the system will determine which server computer 20 to direct the recorded voice command file 30 for speech recognition, based on various parameters, including, but not limited to, the individual server's activity. The server computer 20 can optionally store the recorded voice command file 30 internally for future use. The server computer 20 evaluates the confidence level of the speech recognition process 60 to determine the accuracy of the speech recognition. If the confidence level is at or above a predefined level, then the server 20 will invoke automatic creation of a machine readable command 70 to create an application command 80.

On the other hand, if the confidence level of the speech recognition process 40 is below a predefined level, the server 20 routes the recorded voice command file 30 to a human transcriber for manual review and creation of the machine readable command 90.

Once the machine readable command 80 is created, the server computer 20 transmits the application command 80 to the communication device 10. The communication device 10 directs the received application command 80 to the proper application for execution.

The communication device 10 can be one of many similar type devices available today. The typical communication device 10 will be able to run various applications including, but not limited to, wireless telephone communication, wireless email, calendaring, contact lists, wireless internet web browsing, and multimedia presentation. The applications are typically written in languages that the native device hardware can support, such as C++, Symbian, Java, Linux and the like. In addition, the device 10 may also be able to run applications other than those provided by the device vendor.

Figure 2:
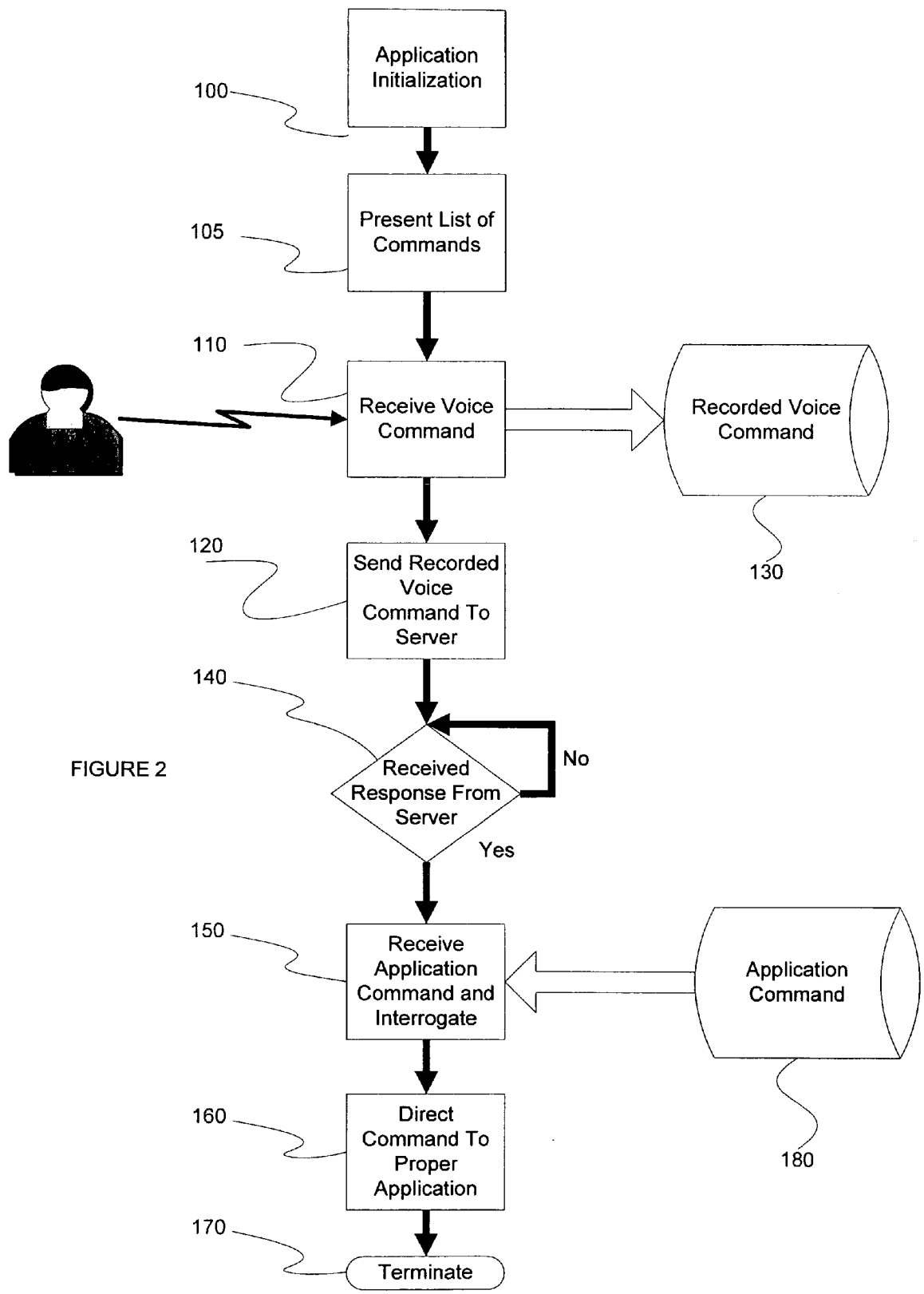

FIG. 2 shows the voice-command application running on the communication device. The user starts the application in a variety of ways, preferably by depressing a button on the device which initiates the application 100. The application prompts the user for an audio recording, such as a verbal command, which it receives 110 and saves as a recorded voice command file 130 in a format that is supported by the device, such as a .wav, .mp3, or .vnf file. Other file formats can be preferable based on the hardware used. If the user is recording a voice command, the application can optionally present a list of possible commands 105.

The device then establishes a wireless data connection with the server computer and transmits the recorded voice command file 130 to the server. The connection may be secure or unsecured communication based on the user's, and system administrator's preference. Preferably, the device maintains the connection with the server computer until the server responds 140. Occasionally, the response can take too long and the data connection terminates before the response is received. In such cases, the device or the server can re-establish communication at a later time to transmit (or receive) the server's response in the form of an application command 180 and terminates the connection.

The communication device receives the application command file 180 and interrogates the application command to determine what actions the communication device must take 150. Based on the application command file 180, the command is directed to the appropriate application for execution 160.

Furthermore, based on the voice command, the execution of an application can be directed to specific content providers. For example, a request for internet content can come from a number of sources on the internet. The telecommunication service running the system can enter into an agreement with an internet content provider to direct all such requests only to that internet content provider. Such an agreement can be financially beneficial to the telecommunications service. Likewise, the user can have a preference of which internet content provider to use and can predefine that provider as the source for such requests.

When the audio recording is a voice command, the voice command preferably will have a standard format that is followed for all commands. A standardized format for voice commands, allows for easier implementation of additional commands. The voice command should begin with a key phrase to identify the type of command. Examples of key phrases include, but are not limited to, "Call contact", "Email", "Search web", "Find movie", or "Play song". The key phrase is followed by additional parameters based on the type of voice command. For example, if the key phrase is "Call contact" an additional parameter would be the contact name. More elaborate examples may include email commands which would include multiple additional parameters such as, contact name or email address, subject, and text. Some parameters may be prefaced with a parameter phrase (such as "subject" for an email voice command) or simply be appended to the key phrase without a parameter phrase, as in a contact name following the key phrase "Call contact".

Once the user recites the voice command into the communication device, the device saves the recorded voice command in an appropriate digital file format for transmission to the server computer. Optionally, the system can also append a unique device identifier indicating which communication device the recorded voice command was received from. Based on the unique device identifier, the system can identify additional useful information described below.

If a contact list is maintained on the communication device, the list can be periodically transmitted with the recorded audio file and maintained on the server computer. The saved contact list is used to increase accuracy of the speech translation. The list is used by the speech recognition process to assist in automatic translation of a voice command requiring input from the contact list. Additionally, if a voice command is sent to a human transcriber for review, the transcriber can access the particular user's contact list, or the contact list can be automatically presented to the human transcriber.

When the contact list is sent to the server computer, the list can be manipulated if needed. For example the server computer can manage the contact names with both the middle initial and without the middle initial so that records without a middle initial resolving back to the record with the middle initial. For example, if the user requests a contact they have in their contact list for Robert Smith, but the only record they have in their database is Robert T. Smith, the system can find Robert T. Smith and return that result to the user.

Figure 3:
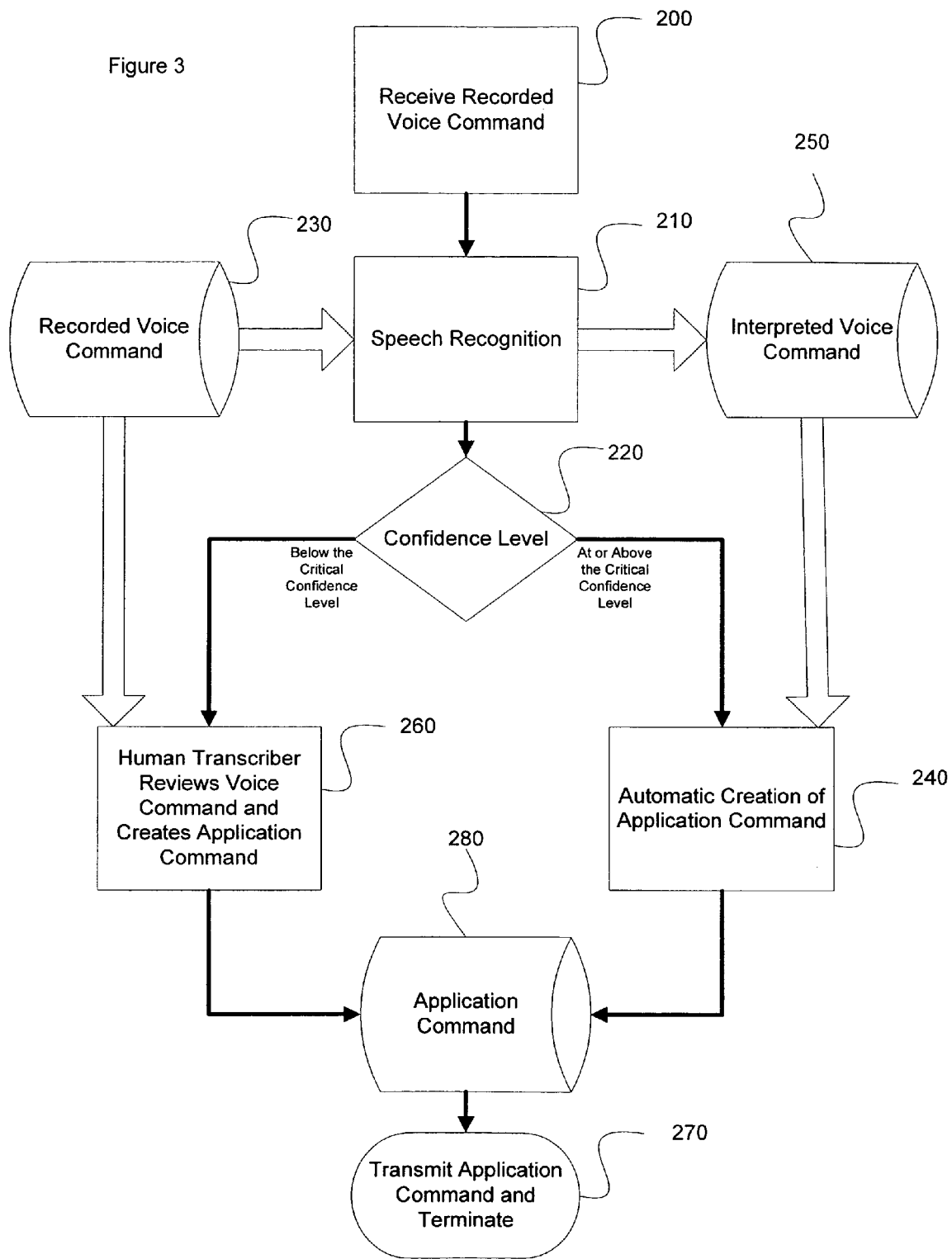

FIG. 3 shows the server computer's processing of a recorded voice command file transmitted from a communication device. The server computer, and all processing of the voice command is typically controlled by the telecommunications service providing wireless communication for the communication device. The communication device establishes a wireless data connection with the server computer and transmits the recorded voice command file to the server computer 200. The server computer performs speech recognition 210 on the recorded voice command file 230. Commercially available speech recognition programs can be used, such as Dragon Naturally Speaking, available from Nuance, Inc., or a custom speech recognition program can be used. The speech recognition process results in the creation of an interpreted voice command file 250. The speech recognition software should also be able to provide a confidence level measuring how confident the software is of accurate recognition of a voice command. Such confidence measurements are typically incorporated in the recognition process.

The critical confidence level, the level at which additional processing must be performed if the confidence of the recognition process is insufficient, can be adjusted by a system administrator, or the system itself. If the confidence level resulting from the speech recognition is at or above the critical confidence level, the application command 280 is automatically created 240 using the interpreted voice command 250 from the speech recognition process 210. Conversely, if the confidence level resulting from the speech recognition is below the critical confidence level, the recorded voice command file 230 is routed to a human transcriber for manual creation of the machine readable command file 280.

The machine readable command file 80 should be in a standard format, such as Xml. A standard format allows for easy inclusion of new commands. For example, if the voice command was "Call contact Bob Jones," the system would identify "Call contact" as the key phrase and build the Xml code for a phone call type (e.g. <commandtype> call). Knowing the command type, the system next parses out the name and creates the Xml code (e.g. <contact>Bob Jones). Thus the application command file 280 would be <commandtype> call <contact> Bob Jones. Other formats are well known to those of ordinary skill in the art and can readily be substituted for Xml format.

Once the application command file 280 is created, regardless of the process employed to create it, the server computer returns the file 280 to the communication device via the established wireless data connection. As described above, if the data connection has terminated, the server computer can re-establish the connection for transmission of the file 280 to the communication device.

Figure 4:
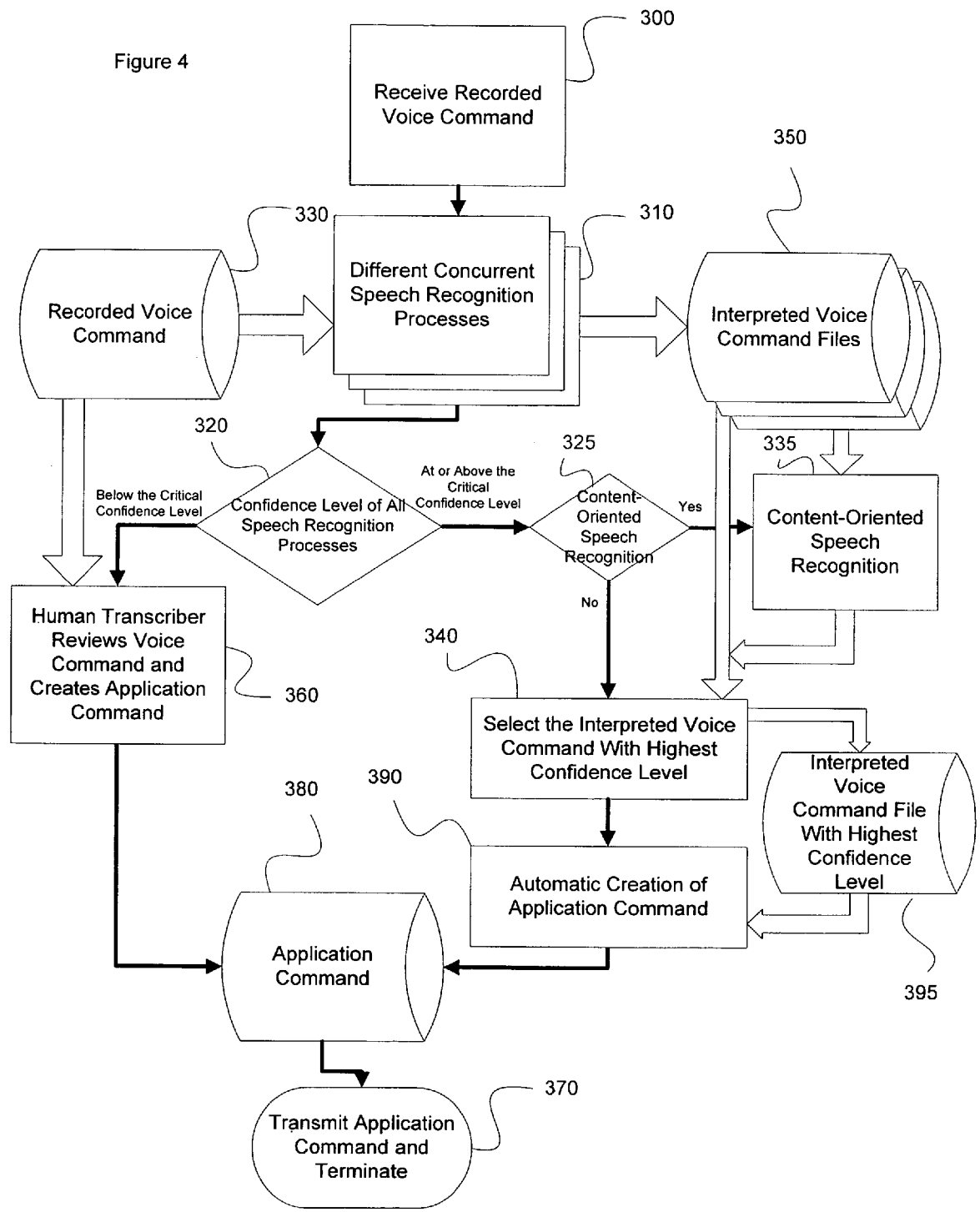

FIG. 4 shows another embodiment of the invention using different concurrent speech recognition processes, rather than a single speech recognition process. This method takes advantage of the differences in different speech recognition systems to obtain the most accurate speech recognition. Upon completion of all speech recognition processes 310, the system evaluates the confidence levels of each process 320. If at least one of the confidence levels of the speech recognition processes 310 is at or above the critical confidence level, the system selects the interpreted voice command file with the highest confidence level 340 and automatically creates an application command 390 based on that interpreted voice command file 395. If none of the processes produce a confidence level at or above the critical confidence level, the recorded voice command is routed to the human transcriber for review and manual creation of the application command 360.

Optionally, an additional, content-oriented speech recognition process 335 may be required. A content-oriented speech recognition process 335 is a process using a particular lexicon, such as a legal lexicon, or a particular language, such as a Spanish lexicon. Based on the results of the initial speech recognition process 310, and assuming the speech recognition process is above the critical confidence level 320, it may be determined that the recorded voice command requires additional processing by a content-oriented speech recognition process 335. Likewise an additional content-oriented speech recognition process 335 may be invoked based on the user having chosen the additional content-oriented speech recognition process. The system will be able to determine what additional content-oriented speech recognition processes a particular user has requested based on the encoded unique identifier.

In one embodiment of the invention, if the recorded voice command file is routed to the human transcriber, the system will attempt to direct the recorded voice command file to the most appropriate transcriber. Selection of the appropriate transcriber may be based on a number of user defined criteria. For example, the system can assess the workload of any particular transcriber and assign the file to the least busy transcriber. Another option is to determine the type of command and assign the recorded voice command file to transcribers who are best suited to that particular type of command. This is particularly useful where the command can demand a greater amount of typing such as an email command, which typically requires additional information to be typed such as the text of the email. Thus a command which has greater typing requirements is directed to transcribers who have been identified as better typists.

Recorded voice command files can also be directed to transcribers who have past experience with the user who created the voice command. Since a unique identifier is optionally appended to each recorded voice command file, the system can determine which transcribers have previously reviewed voice commands from the user who recorded the voice command. Because of regional dialects, and accents, it may be desirable to have the same transcriber review voice commands from the same user. That way, the transcriber becomes familiar with user's accent and future transcriptions are easier for the transcriber.

Commands can also be prioritized based on the timeliness of the command. For example, commands that require immediate response, such as a command to initiate a call, would have a higher priority, and therefore be assigned to a transcriber quicker, than commands which do not typically require an immediate response, such as for sending an email.

Once a recorded voice command file has been routed to a human transcriber, an automatic screen can be presented to the transcriber which includes visual clues for the transcriber including the user's past history and other speed techniques designed to expedite processing by the human transcriber. After the transcriber has manually created the application command file, the transcriber can be prompted by the system to update a user's speech recognition grammar file, which will assist the speech recognition process in recognizing the voice command as described in greater detail below.

Figure 5:
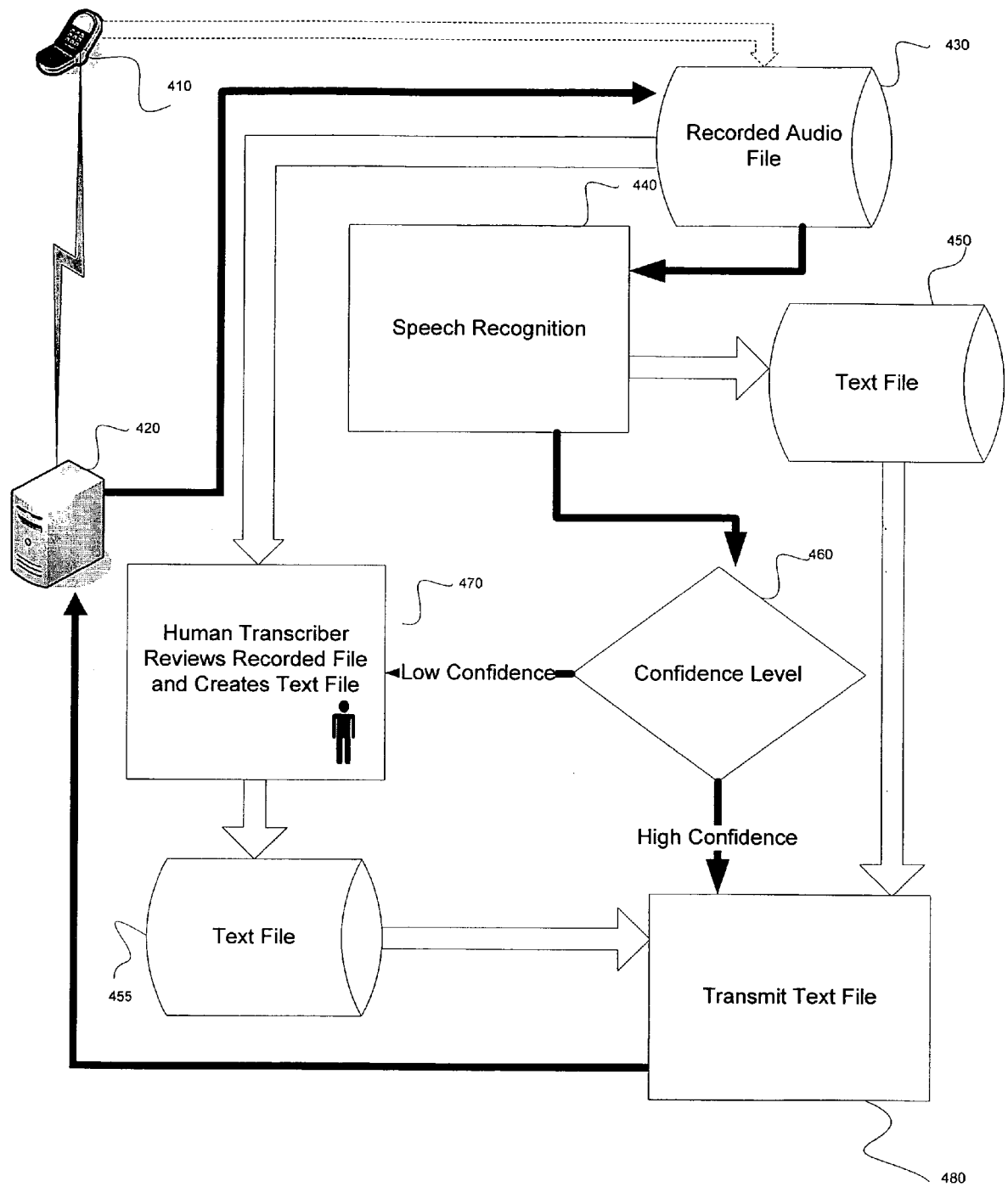

Another embodiment is shown in FIG. 5. In this embodiment, the user records textual information to be saved as, for example, a note, letter, memo, or reminder, and stores the resulting text file on the communication device 410. Similar to the previous embodiment, the audio data is stored in a recorded audio file 430 and transmitted to the server computer 420. The recorded audio file 430 is processed through a speech recognition server module 440 which creates an text file 450. The server computer 420 evaluates the confidence level of the speech recognition process 460 to determine the accuracy of the speech recognition. If the confidence level is at or above a predefined level, then the automatically created text file 450 is transferred to the server module 480 for transmission to the communication device 410. Conversely, if the confidence level of the speech recognition process 440 is below a predefined level, the server 420 routes the recorded audio file 430 to a human transcriber 470 for manual review and creation of the text file 455.

Regardless of the method used to create the text file 450 or 455, the text file is transmitted 480 along the already established wireless data connection. Once returned to the communication device 410, the text file can be saved on the communication device, and displayed using an application suited for display of text data, such as a notebook, or word processor.

In another embodiment, the system has one or more application program interfaces, which can determine the type of voice command and direct creation of the application command to another organization. In this way, an organization can construct its own set of voice commands unique to an application running on the communication device. This is advantageous where an organization has information that can easily be accessible, but does not want to, or cannot, make the information available to the telecommunications service running the system. For example a sales organization may want to give its sales force access to company confidential information via the communication device, but does not want the information to be accessible by the telecommunications service. When the system determines that the voice command is one of these special type of commands, the recorded voice command file is transferred to the organization to create the application command file. The resulting application command file will preferably be encrypted using any of the commonly known encryption methodologies known to one of ordinary skill in the art. The encrypted application command file is transferred back to the telecommunications service for transmission to the communications device. Once received on the communications device, the encrypted application command is directed to a unique application on the communication device, provided by the organization.

In another embodiment, the unique identifier of the communication device appended to the recorded voice command is used to identify the user reciting the voice command. Thus, when the server computer receives the recorded voice command from the communication device, the system can determine who the user is and if the user is eligible for voice command service by the telecommunication service. In addition, the speech recognition process can access a user's grammar file created for the specific user. The grammar file contains examples of the user's speech patterns and can be used to assist in the speech recognition process. Grammar files for a specific user are well known in the art and a standard component of most commercially available speech recognition systems. Construction of a grammar file can be performed by the user, or a human transcriber can create the grammar file as described above.

What is claimed:

1. A method of using speech recognition software for recorded audio data received from a wireless communication device, comprising:

Receiving recorded audio data communicated from a wireless communication device and directing the audio data to more than one simultaneous servers running speech recognition software, wherein the number of simultaneous servers running speech recognition software receiving the same audio data is controlled by the communication device user's options;

Receiving a confidence level of recognition from each server running speech recognition software;

Routing the recognition result with the highest confidence level for further processing;

wherein receiving a confidence level of recognition from each server running speech recognition software includes:

upon detecting that each confidence level of recognition from each server running speech recognition software is below a predefined level, routing the recorded audio data to a location associated with a human transcriber currently experiencing an acceptable workload:

receiving a machine readable command from the location associated with the human transcriber, the machine readable command comprising a representation of an application response to the recorded audio data, the machine readable command created by the human transcriber;

creating an application command based on the machine readable command; and transmitting the application command to the wireless communication device.

2. The method in claim 1 wherein the number of simultaneous servers running speech recognition software receiving the same audio data is defined by the system administrator.

3. The method in claim 1 including one or more additional servers running speech recognition software; and Wherein the recorded audio data is further processed by the one or more additional servers is based on the type of audio data being processed.

4. The method in claim 1 including one or more additional servers running speech recognition software; and Wherein the recorded audio data is further processed by the one or more additional servers is based on the communication device user's options.

5. A method of using speech recognition software for recorded audio data received from a wireless communication device, comprising:

Receiving recorded audio data communicated from a wireless communication device and directing the audio data to more than one simultaneous servers running speech recognition software, wherein the number of simultaneous servers running speech recognition software receiving the same audio data is controlled by the communication device user's options;

Receiving a confidence level of recognition from each server running speech recognition software; and Routing the recognition result with the highest confidence level for further processing:

wherein directing the audio data to more than one simultaneous servers running speech recognition software includes:

appending at least one unique identifier to the recorded audio data, the unique identifier associated with at least one human transcriber who has previously reviewed voice commands from a user currently associated with the wireless communication device, the unique identifier further indicative of an accent of the user currently associated with the wireless communication device;

wherein receiving a confidence level of recognition from each server running speech recognition software includes:

upon detecting that each confidence level of recognition from each server running speech recognition software is below a predefined level, routing the recorded audio data to a location associated with the human transcriber who has previously reviewed voice commands from a user currently associated with the wireless communication device;

receiving a machine readable command from the location associated with the human transcriber, the machine readable command comprising a representation of an application response to the recorded audio data, the machine readable command created by the human transcriber;

creating an application command based on the machine readable command; and transmitting the application command to the wireless communication device.

6. A method of using speech recognition software for recorded audio data received from a wireless communication device, comprising:

Receiving recorded audio data communicated from a wireless communication device and directing the audio data to more than one simultaneous servers running speech recognition software, wherein the number of simultaneous servers running speech recognition software receiving the same audio data is controlled by the communication device user's options;

Receiving a confidence level of recognition from each server running speech recognition software; and Routing the recognition result with the highest confidence level for further processing:

wherein receiving a confidence level of recognition from each server running speech recognition software includes:

upon detecting that each confidence level of recognition from each server running speech recognition software is below a predefined level, routing the recorded audio data to a location associated with a human transcriber identified according to criteria defined by a user currently associated with the wireless communication device;

creating data, to be presented at the location associated with the human transcriber, representing indication of the user's historical activity;

receiving a machine readable command from the location associated with the human transcriber, the machine readable command comprising a representation of an application response to the recorded audio data, the machine readable command created by the human transcriber;

creating an application command based on the machine readable command;

transmitting the application command to the wireless communication device;

creating a prompt to be presented at the location associated with the human transcriber, the prompt requesting an update to a speech recognition grammar file associated with the user currently associated with the wireless communication device, the update indicative of an interpretation of the recorded audio data made by the human transcriber, the updated speech recognition grammar file enhancing the servers running speech recognition software ability to process subsequent recorded audio data created by the user currently associated with the wireless communication device.

7. A method of using speech recognition software for recorded audio data received from a wireless communication device, comprising:

Receiving recorded audio data communicated from a wireless communication device and directing the audio data to more than one simultaneous servers running speech recognition software, wherein the number of simultaneous servers running speech recognition software receiving the same audio data is controlled by the communication device user's options;

Receiving a confidence level of recognition from each server running speech recognition software; and Routing the recognition result with the highest confidence level for further Processing;

wherein directing the audio data to more than one simultaneous servers running speech recognition software includes:

appending at least one unique identifier to the recorded audio data, the unique identifier associated with a user of the wireless communication device;

wherein receiving a confidence level of recognition from each server running speech recognition software includes:

upon detecting that each confidence level of recognition from each server running speech recognition software is below a predefined level, routing the recorded audio data to a location associated with the human transcriber;

based on the unique identifier, selecting a grammar file, the grammar file including a representation of at least one example of the user's speech pattern;

transmitting the grammar file for presentation at the location associated with the human transcriber;

receiving a machine readable command from the location associated with the human transcriber, the machine readable command comprising a representation of an application response to the recorded audio data, the machine readable command created by the human transcriber;

creating an application command based on the machine readable command; and transmitting the application command to the wireless communication device.

8. A method of using speech recognition software for recorded audio data received from a wireless communication device, comprising:

Receiving recorded audio data communicated from a wireless communication device and directing the audio data to more than one simultaneous servers running speech recognition software, wherein the number of simultaneous servers running speech recognition software receiving the same audio data is controlled by the communication device user's options;

Receiving a confidence level of recognition from each server running speech recognition software; and Routing the recognition result with the highest confidence level for further processing:

wherein receiving a confidence level of recognition from each server running speech recognition software includes:

upon detecting that each confidence level of recognition from each server running speech recognition software is below a predefined level, routing the recorded audio data to a location associated with a human transcriber currently experiencing an acceptable workload, wherein the communication device user's options include indicating the user has selected to provide speech structured in accordance with a standardized format for voice commands, the recorded audio data representing speech structured in accordance with the standardized format for voice commands;

receiving a machine readable command from the location associated with the human transcriber, the machine readable command comprising a representation of an application response to the recorded audio data, the machine readable command created by the human transcriber;

creating an application command based on the machine readable command; and transmitting the application command to the wireless communication device.

* * * * *